United States Patent
Myers

[15] 3,706,239
[45] Dec. 19, 1972

[54] PINION DIFFERENTIAL MECHANISM HAVING INTERNAL BIAS TORQUE
[72] Inventor: Albert F. Myers, Warren, Mich.
[73] Assignee: Boise Cascade Corporation, Boise, Idaho
[22] Filed: Feb. 9, 1971
[21] Appl. No.: 113,899

[52] U.S. Cl. .................... 74/715, 74/711, 74/714, 74/801
[51] Int. Cl. .............................. F16h 1/38
[58] Field of Search ............ 74/714, 715, 801, 711

[56] References Cited

UNITED STATES PATENTS

| 3,406,593 | 10/1968 | Vesey | 74/711 |
| 2,972,265 | 2/1961 | Walter | 74/715 |
| 3,375,735 | 4/1968 | Saari | 74/711 |
| 827,095 | 7/1906 | Gray | 76/714 |
| 2,178,613 | 11/1939 | Seeck | 74/715 |
| 1,417,797 | 5/1922 | Cook et al. | 74/801 |

Primary Examiner—C. J. Husar
Attorney—Robert G. Mentag

[57] ABSTRACT

A positive drive differential mechanism for use in the driveline of an automotive vehicle comprising discrete pairs of differential pinions carried by a differential carrier and side gears having a common axis that is parallel to the axes of the pinions, the pinions of each pair being in meshing engagement, one pinion of each pair engaging one side gear and the other engaging a second side gear thereby establishing a double torque delivery path from a ring gear carried by the carrier and each of two axle shafts, each shaft being connected to a separate one of the side gears to the pinions being journaled rotatably in cooperating pinion recesses formed in the carrier, thus providing an outside diameter running fit between the pinions and the carrier and establishing an inherent friction bias torque.

5 Claims, 11 Drawing Figures

PATENTED DEC 19 1972 3,706,239

INVENTOR.
ALBERT F. MYERS

INVENTOR.
ALBERT F. MYERS

EXTERNAL TOOTH DATA:
PITCH _____ 8
P. A. _____ 30°
ADDENDUM _____ .080
DEDENDUM _____ .100
PITCH DIA. _____ 2.063
I. D. _____ 1.863
O. D. _____ 2.223
NO. TEETH _____ 14
TOOTH WIDTH -
  NORMAL _____ .1963
  PLANE OF ROTATION _____ .2314
  HELIX ANGLE _____ 32° R.H.

EXTERNAL TOOTH DATA:
PITCH _____ 8
P. A. _____ 30°
ADDENDUM _____ .080
DEDENDUM _____ .100
PITCH DIA. _____ 2.063
I. D. _____ 1.863
O. D. _____ 2.223
NUMBER OF TEETH _____ 14
TOOTH WIDTH -
  NORMAL _____ .1963
  PLANE OF ROTATION _____ .2314
  HELIX ANGLE _____ 32° L.H.

INVENTOR.
ALBERT F. MYERS

PATENTED DEC 19 1972 3,706,239

EXTERNAL TOOTH DATA:
PITCH _____ 8
P.A. _____ 30°
ADDENDUM _____ .080
DEDENDUM _____ .100
P.D. _____ .884
TEETH _____ 6
TOOTH WIDTH-NORM. ___ .1963 CIR.
TOOTH WIDTH-ROTATION _ .2314 CIR.
HELIX ANGLE _____ 32°

INVENTOR.
ALBERT F. MYERS

PINION DIFFERENTIAL MECHANISM HAVING INTERNAL BIAS TORQUE

GENERAL DESCRIPTION OF THE INVENTION

In a torque delivery driveline for a wheeled vehicle torque is delivered from a vehicle engine through a multi-ratio power transmission mechanism to a vehicle drive shaft. The torque output end of the drive shaft is connected drivably through a universal joint to a differential pinion which meshes with a differential ring gear. The differential mechanism establishes a driving torque path between the ring gear and each of two axle shafts extending transversely with respect to the drive shaft.

In conventional differential-and-axle assemblies a split torque delivery path is established through the differential gear mechanism so that a driving torque balance is achieved permitting driving torque to be delivered to each traction wheel when the coefficient of friction between the wheel and the road surface is sufficient to prevent wheel slippage. If one wheel should lose traction for some reason, it will tend to overspin with respect to the other wheel, thereby causing a loss of tractive effort regardless of the magnitude of the coefficient of friction for the other wheel.

I am aware of various differential and axle designs wherein an attempt is made to introduce a positive traction characteristic that will prevent overspinning of one traction wheel with respect to the other. These include friction clutch mechanisms for clutching together one side gear and the differential carrier. In these instances, overspinning of one wheel with respect to the other cannot be accomplished unless the friction surfaces of the clutch are caused to slip. This introduces a torque bias which reduces the loss of tractive effort as one wheel encounters a road surface of low coefficient of friction. Other positive traction differential mechanisms employ automatically actuated cam elements which are engaged by relatively displaceable components of the differential assembly. These cam elements become self-actuated upon relative movement thereof with respect to the differential carrier, thus introducing a releasable mechanical torque delivery path between the differential ring gear and one or both of the axle shafts.

My invention is adapted to be used in environments of this type as well as interaxle differential mechanisms such as the ones disclosed in U.S. Pat. No. 3,388,760.

The improved differential mechanism of my invention avoids the need for providing friction torque clutches or cam actuated lock-up devices. I have accomplished this by designing the torque delivery gear elements of the differential mechanism so that they develop an inherent friction torque bias as relative motion occurs due to the differentiating action of the mechanism. The space required for the usual clutch or cam mechanisms is not required. Introduction of a friction torque bias requires no additional elements, such as preloaded clutch actuating springs, that would increase the manufacturing cost.

In a preferred embodiment of my invention, the differential carrier is formed into parts, each part having pinion recesses in the form of internal cylindrical cavities. The geometric axes of the cavities are situated in parallel disposition with respect to the axle shafts. The cavities in one housing part register and align with the cavities in the other housing part so that when the parts are joined together in juxtaposed relationship, a single cylindrical cavity for each differential pinion is provided.

The differential housing journals rotatably a pair of differential side gears. One axle shaft is connected to each side gear. The carrier housing in turn is journaled rotatably within a relatively stationary differential housing to which the axle shaft housings are secured. An illustration of such an arrangement may be seen by referring to U.S. Pat. No. 3,283,611.

The pinion cavities are arranged in discrete pairs, one cavity of each pair intersecting the other cavity of that pair. When the pinions are mounted within their respective cavities, the pinions of each discrete pair mesh with each other. One pinion of each pair meshes in turn with one side gear, and the other meshes with the adjacent side gear. The pinions of each pair are offset axially with respect to each other. The side gears are journaled within a centrally disposed pinion opening in the differential carrier housing.

The portions of the differential pinions that are arranged in meshing engagement are supported by a spacer member situated between the two side gears.

Unlike prior art arrangements such as that shown in Walter U.S. Pat. No. 2,972,265 and Randall U.S. Pat. No. 2,462,000, the differential pinions of my invention are not mounted upon pinion shafts carried by the carrier. No pinion shafts of any type are required. The pinions themselves are journaled within their respective pinion cavities in the carrier housing with an outside diameter running fit. The transverse forces due to the gear tooth loadings on the pinions cause an inherent frictional resistance at the outside diameter fit, thus introducing an inherent torque bias. The magnitude of the bias torque is proportional to the transverse gear tooth loading, which in turn is proportional to the torque transmitted through the differential assembly.

Also unlike the earlier differential designs such as those disclosed in the Walter and Randall patents, my improved design does not require special gear tooth configurations. It is possible, for example, to use eight pitch teeth with a conventional pressure angle such as 30°. A conventional helix angle of 32° also may be used. The presence of the helix angle introduces an axial thrust on the respective differential pinions causing a frictional drag due to the frictional engagement of the axial ends of the pinions with the bases of the pinion cavities of the differential carrier housing.

The friction due to the reaction forces on the housing at the axial ends of the meshing pinions is created because the pinion gear tooth forces do not cancel each other. These friction forces on the housing complement the friction forces created by reason of the sliding contact of the addendum surfaces of the pinions on the circular walls of the pinion cavities. Because of the disposition of the pinion cavities in discrete pairs, the housing more completely surrounds the pinions than would be the case if the pinions were not located in disxrete pairs.

Of course the friction forces can be varied by altering the diameter of the pinions, their circular pitch or their helix angles, thereby providing parameters that can be varied to suit any particular design requirement. Also, the numbers of pairs of pinions may be varied to provide a different bias torque, although four pairs are used in the particular embodiment disclosed in this specification.

The tooth forces acting on the meshing pinions also will have a radial component due to the pressure angle of the pinion teeth. This tends to cause the individual pinions to become misaligned or cocked with respect to each other. The presence of the axial gear tooth forces due to the helix angle induces also a cocking couple which tends to increase the cocking force couple caused by the radial force component in the case of one pinion as it is reduced in the case of the other. The force couples induced by the helix angle are in addition to the end thrust forces on the housing and the reaction thrust forces on the side gears. The forces on the side gears cause a force imbalance due to the presence of friction in the pinion meshes and the presence of friction between the housing and the pinions. This results in a primary force on one side gear that is different than the reaction force on the opposite side gear. The transverse forces at the point of mesh of the pinions of each pair which are distributed to the surrounding housing wall are greater than the corresponding transverse forces that would exist at the pinion mesh points of prior art differential gear arrangements where a full circle of pinions is used. The transverse loads at the pinion mesh points in such prior art arrangements tend to cancel each other.

In addition to the friction forces established in this manner, the tooth forces causing the pinions to cock result in a tendency to break through the oil film that exists between the addendum surfaces of the pinions and the surrounding housing cavity, which again helps to increase the magnitude of the torque bias and avoids further the need for using preloaded springs. The absence of the springs avoids an undesirable reaction force sensation at the steering wheel that otherwise would be experienced at the instant differential action occurs. That steering sensation results from the tendency of the preloaded springs to initially prevent differential action as one wheel tends to overspin with respect to the other.

PARTICULAR DESCRIPTION OF THE INVENTION

Figure 1:
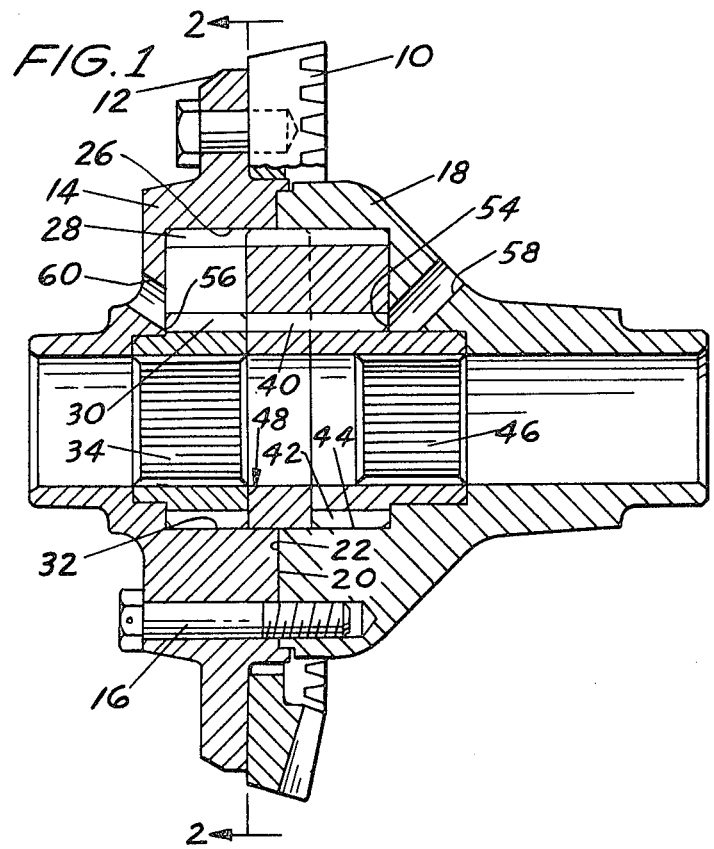
FIG. 1 is a cross sectional assembly view of a differential mechanism embodying the improvements of my invention.

Numeral 10 of FIG. 1 designates a differential ring gear which is adapted to be engaged with a differential drive pinion in a differential and axle assembly. A typical environment for such an arrangement may be seen by referring to U.S. Pat. No. 3,283,611.

Ring gear 10 is bolted or otherwise secured to flange 12 located on the outer periphery of differential carrier housing part 14. This part is joined by means of bolt 16 to a companion differential carrier housing part 18. The part 14 includes a radial surface 20, which is arranged in abutting relationship with respect to radial surface 22 on part 18. When the two parts are joined together, they form a unitary carrier housing.

Figure 2:
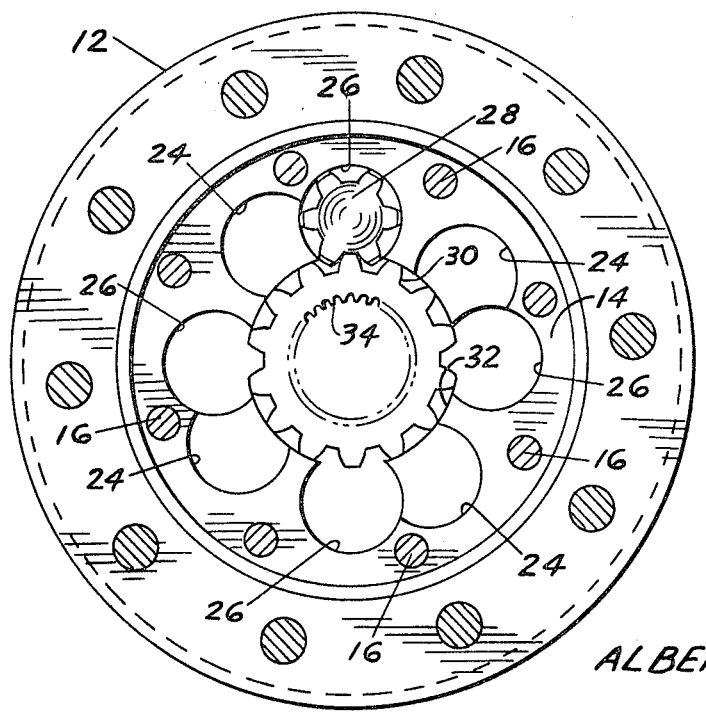
FIG. 2 is a cross sectional view taken along the plane of section line 2—2 of FIG. 1.

Housing part 14 is provided with four discrete pairs of pinion openings (FIG. 2). Each pair comprises a pinion opening 24 and a companion pinion opening 26. The openings are cylindrical and the axes thereof extend parallel to the axis of rotation of ring gear 10. Cavity 26 in housing part 14 has a depth that is considerably greater than the depth of cavity 24 in housing part 14. A helical differential pinion 28 positioned within the opening 26 meshes drivably with helical side gear 30 located within a centrally disposed stepped cavity 32 in housing part 14. Side gear 30 is internally splined at 34 to permit a splined driving connection with the inboard end of an axle shaft not shown. The outboard end of the shaft may be connected drivably to one of the traction wheels of the vehicle.

Figure 5:
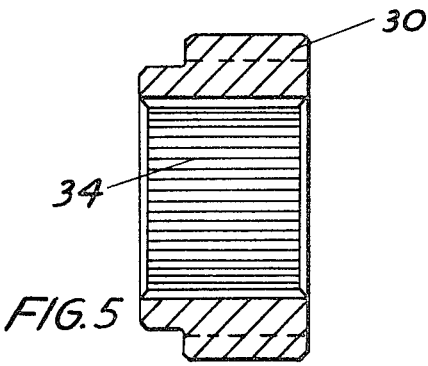
FIG. 5 is a side gear located on the left hand side of the assembly of FIG. 1. It is taken along the plane of section line 5—5 of FIG. 6.
Figure 6:
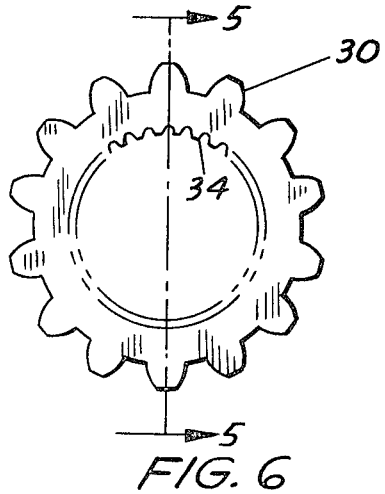
FIG. 6 is an end view of the gear of FIG. 5.

Side gear 30 is shown in FIG. 5. It may be a conventional eight pitch, helical gear with a right hand helix and a pressure angle of 30°. The pinion 28 which meshes with gear 30, of necessity, is a left hand helix. The clearance that exists between the outside diameter of the pinion 28 and the inside cylindrical surface of the opening 24 may be 0.002 to 0.008 inches. Although I have particularly shown and described the external tooth configuration of side gears 30 and 42, I contemplate that the improvements of my invention might be applied to a differential having internal helical side gears.

Figure 3:
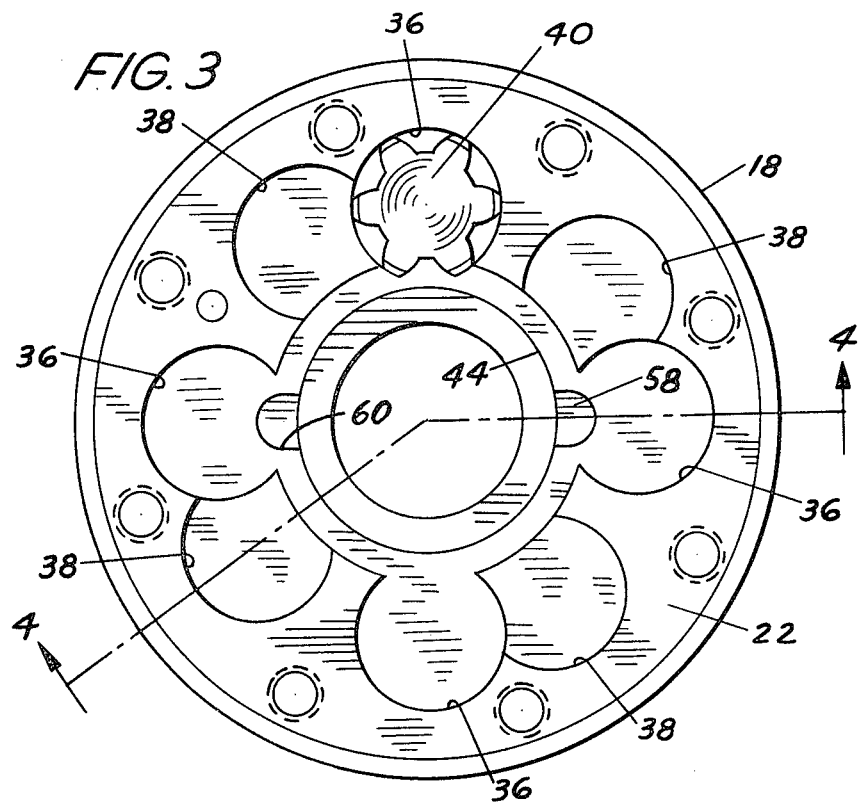
FIG. 3 is a cross sectional view of the right half of the differential carrier housing of FIG. 1. It is taken along the plane of section line 3—3 of FIG. 4.
Figure 4:
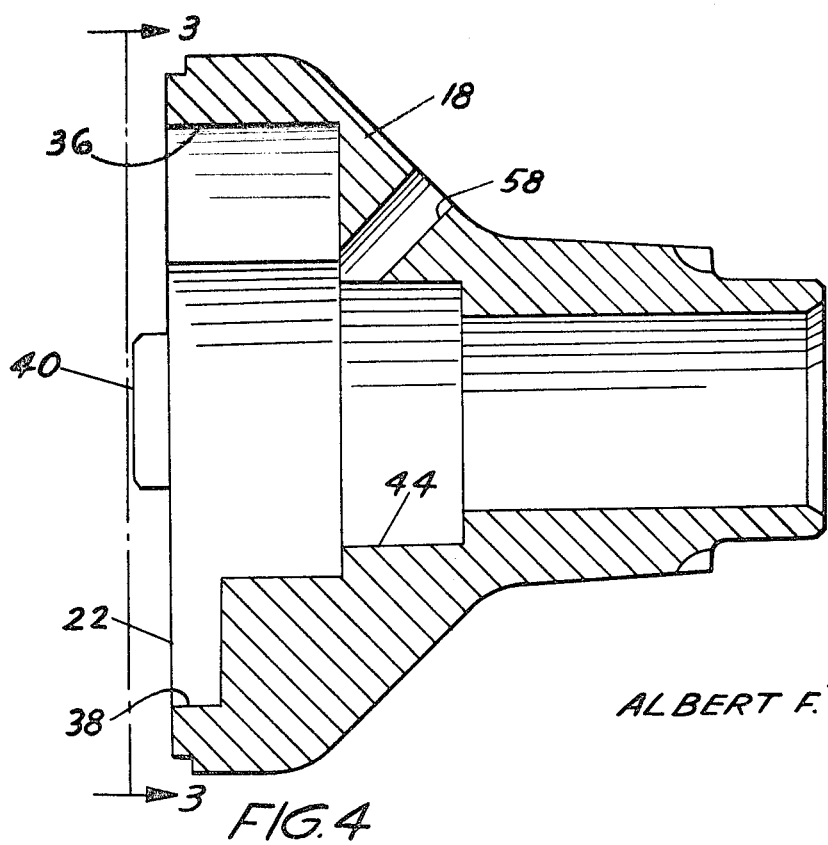
FIG. 4 is a cross sectional view taken along the plane of section line 4—4 of FIG. 3.

The housing part 18 of the carrier housing also is formed with axially positioned pinion cavities. These are arranged in pairs as indicated in FIG. 3. One cavity of each pair is of a relatively greater depth than the other. The deeper of the two cavities of each pair is identified in FIG. 3 by reference character 36. The shorter of the two cavities of each pair is identified by reference character 38. A differential pinion 40 having right hand helical gear teeth is situated in each opening 36. Each opening 38 receives the right hand end of one of pinions 28.

Pinions 40 extend within pinion recesses 24 formed in the housing part 14. Each pinion 40 of each pair of pinions engages drivably the companion pinion 28 of that pair. Like the pinions 28, pinions 40 are journaled within their respective pinion cavities with an outside diameter running with the same running tolerances.

Figure 7:
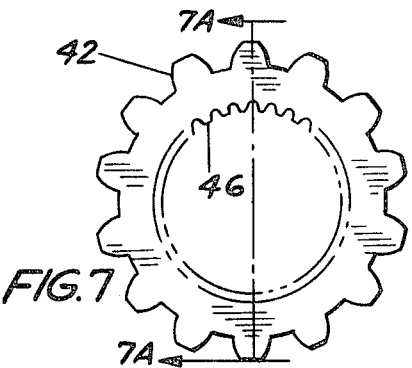
FIG. 7 is an end view of a side gear located on the right hand side of the assembly of FIG. 1.
Figure 7A:
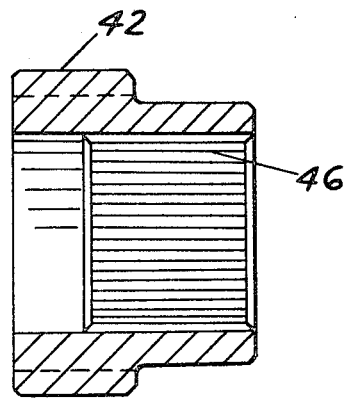
FIG. 7A is a cross sectional view taken along the plane of sectional line 7A—7A of FIG. 7.

The side gear 42 is situated within a centrally disposed stepped gear cavity 44 in housing part 18. It meshes with pinions 40. This gear is shown more particularly in FIGS. 7 and 7A. It is internally splined at 46 to permit a splined driving connection with the inboard ends of the other axle shaft which extends to the other vehicle traction wheel.

Figure 8:
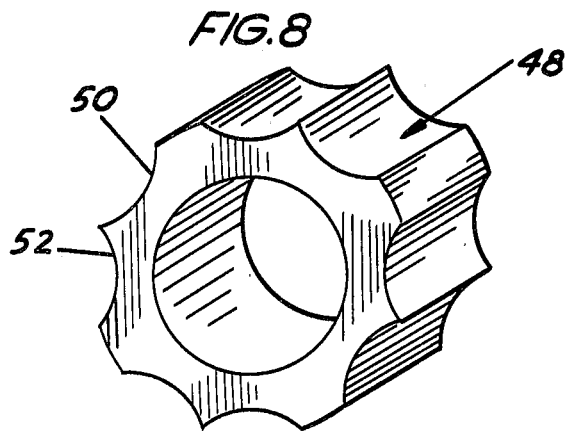
FIG. 8 is a spacer situated in the assembly of FIG. 1 between the two side gears.
Figure 9:
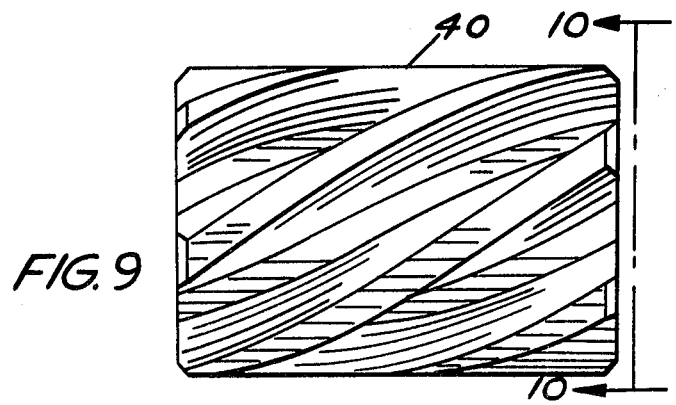
FIG. 9 is a side view of one of the pinion gears used in the assembly of FIG. 1.
Figure 10:
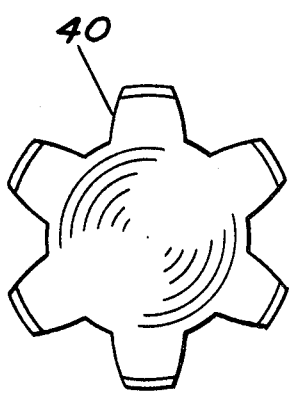
FIG. 10 is an end view of the pinion gear of FIG. 9 as seen from the plane of section line 10—10 of FIG. 9.

A spacer 48 is located between the two side gears 30 and 42. It is indicated particularly in FIG. 8. The spacer is formed with arcuate regions on its periphery, each region comprising two arcuate segments 50 and 52. Segment 50 is adapted to engage the outer surfaces at the addenda of the pinions 40 and arcuate segments 52 are adapted to engage the corresponding outer surfaces at the addenda of pinions 28, thereby providing radial support at the region where pinions 28 and 40 drivably engage each other.

When torque is applied to ring gear 10, it is distributed through two parallel torque delivery paths which include the meshing differential pinions 28 and 40. This introduces radial gear tooth loading on the pinions, which results in frictional resistance due to rotation thus introducing an inherent bias torque. Because of the helix angle on the pinions 28 and 40 and on the companion side gears, a thrust force is produced on the pinions causing frictional resistance due to the engagement of the pinions with the ends of their respective pinion cavities. A thrust force is introduced also on the spacer element due to the axial gear tooth loading on the two side gears. Another thrust force is produced due to the axial gear tooth loads transmitted to shoulders 54 and 56 on the housing parts 18 and 14, respectively.

When a conventional mechanism is transmitting torque with the vehicle moving in a straight driving path, no differential motion exists in the gearing. There then is no bias torque except in those instances when the vehicle undergoes turning maneuvers or when one traction wheel loses traction and a spin-out condition tends to occur. But since such conditions are transient, there's no opportunity for a prolonged frictional horsepower loss to occur. Overheating and oil film breakdown should not occur.

Suitable lubrication oil to provide a normal lubrication oil film can be introduced into the pinion and gear cavities through lubrication oil ports 58 and 60, formed in housing parts 18 and 14, respectively. Lubrication oil normally present in the differential housing is admitted through these ports to the interior of the carrier housing.

Having thus described a preferred form of my invention what I claim and desire to secure by U.S. Letters Patent is:

1. In a gear differential mechanism for use in a vehicle driveline adapted to deliver driving torque from a drive shaft to each of two axle shafts, a differential carrier housing adapted to be driven, a pair of helical side gears journaled rotatably with respect to said housing, said side gears being arranged in coaxial disposition, one side gear being adapted to be connected to one axle shaft and the other side gear being adapted to be connected to the other axle shaft, discrete pairs of differential helical pinions, said housing having pairs of cylindrical openings, a separate pinion of each pair being received within each opening and journaled therein with an outside diameter running fit, the axes of said pinions being parallel to the common axis of said side gears, one pinion of each pair meshing with the other pinion of that pair, the pinion of one pair being independent of and out of engagement with the pinion of another pair, one pinion of each pair engaging one side gear and the other pinion of each pair engaging the other side gear whereby the torque transmitted through said differential mechanism introduces gear tooth loads on said pinions which cause a frictional torque resistance as the pinions rotate within their respective pinion cavities thus introducing a torque bias in said mechanism.

2. The combination set forth in claim 1 wherein one pinion of each pair has right hand helical gear teeth and the other pinion of that pair has left hand helical gear teeth, one end of one pinion of each pair engaging its companion side gear at one end of said one pinion, one end of the other pinion engaging its companion side gear at one end of said other pinion, said pinions being offset axially so that their adjacent other ends mesh with each other, and a spacer member situated between said side gears and supporting said pinions at the region of the meshing engagement between the pinions of each pair.

3. The combination as set forth in claim 1, wherein said carrier housing comprises two parts, pairs of pinion openings formed in each part, said parts being adapted to be joined together in abutting relationship with their respective pinion openings registering to provide a single pinion cavity for each pinion of each pair.

4. The combination as set forth in claim 2, wherein said carrier housing comprises two parts, pairs of pinion openings formed in each part, said parts being adapted to be joined together in abutting relationship with their respective pinion openings registering to provide a single pinion cavity for each pinion of each pair.

5. The combination as set forth in claim 1, wherein said carrier housing comprises two parts, pairs of pinion openings formed in each part, said parts being adapted to be joined together in abutting relationship with their respective pinion openings registering to provide a single pinion cavity for each pinion of each pair, said pinions engaging the ends of their respective cavities whereby axial components of the gear tooth loads on said pinions establish a friction torque component to complement the friction torque component due to transverse gear tooth loads on said pinions.

* * * * *

UNITED STATES PATENT OFFICE
CERTIFICATE OF CORRECTION

Patent No. 3,706,239　　　　　　　　　Dated December 19, 1972

Inventor(s) ALBERT F. MYERS

It is certified that error appears in the above-identified patent and that said Letters Patent are hereby corrected as shown below:

In the Abstract, line 10 of the body of the Abstract, "and" should be -- to --; line 11 of the body of the Abstract, "to" (second occurrence) should be -- and --.

Signed and sealed this 1st day of May 1973.

(SEAL)
Attest:

EDWARD M. FLETCHER, JR.　　　　　　ROBERT GOTTSCHALK
Attesting Officer　　　　　　　　　　Commissioner of Patents